Jan. 28, 1936.  W. C. DILLON  2,028,969

THERMOMETER

Filed March 30, 1933

INVENTOR.
William Carrothers Dillon.
BY
Ben J. Chromy
ATTORNEYS.

Patented Jan. 28, 1936

2,028,969

UNITED STATES PATENT OFFICE 2,028,969

THERMOMETER

William Carrothers Dillon, Chicago, Ill.

Application March 30, 1933, Serial No. 663,626

4 Claims. (Cl. 73—118)

This invention relates to measuring instruments generally. More specifically this invention relates to devices for determining when heated metal or liquid is at a predetermined temperature.

An object of this invention is to provide a small portable device which may be carried in a tool kit and is readily adapted for use in determining when a body of hot metal or liquid is at a predetermined temperature.

In the carrying out of soldering operations when sealing cable joints and electrical connections it is essential that the solder be kept at a predetermined temperature to insure smooth joints. Should the soldering material be too hot damage to the lead sheathing of the cable or to the lead sleeve will result and if it is not hot enough trouble due to the porous nature of the metal at the joints develops.

Various methods for testing the temperature in an inaccurate manner have been in use. Such materials as a twist of paper were immersed into the metal. If the metal was too hot for the particular work the paper turned black and if it was of the right temperature the paper became a brownish color. Various papers were used and each gave different indications although seldom definite reliable results were obtained.

Figure 1:
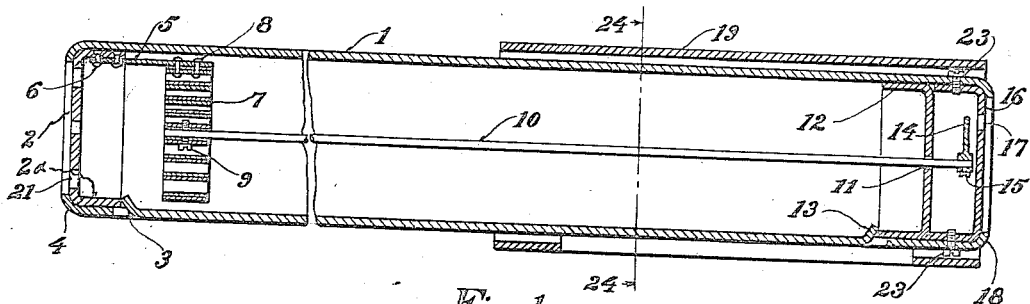
Figure 2:
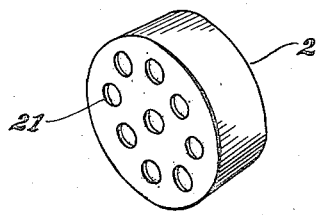
Figure 3:
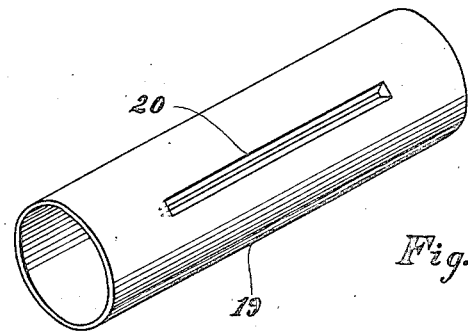
Figure 4:
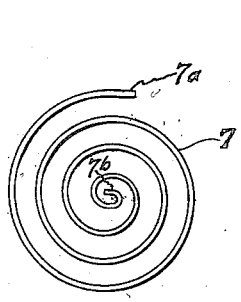
Figure 6:
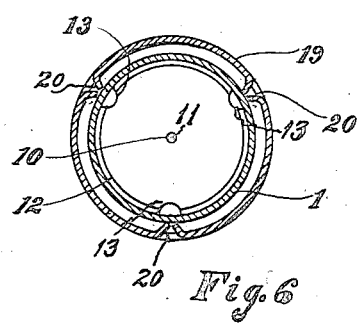
Figure 5:
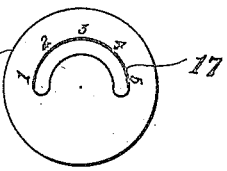
Figure 7:
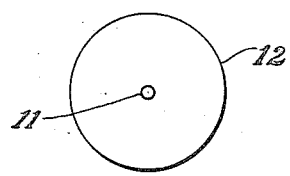

In accordance with this invention I have provided a reliable, convenient and rugged temperature indicating device adapted to be used for readily and efficiently obtaining the temperature of hot metals, such as, solder and the like. The device of my invention is provided with a small tubular casing, one end of which is immersed into the liquid to be tested for temperature and the other end of which is provided with an indicating scale. This invention will be more fully understood from the following specification and the accompanying drawing in which briefly Fig. 1 illustrates a sectional view of an embodiment of this invention; Fig. 2 is a view in perspective of a disc shaped member inserted into one end of the thermometer tube; Fig. 3 shows a view in perspective of the external tube provided to serve as the thermometer handle; Fig. 4 illustrates a detail view of the bi-metal thermostatic unit; Fig. 5 is an end view of the scale exhibiting end of the thermometer; Fig. 6 is a sectional view taken along the line 24—24 of Fig. 1 and Fig. 7 illustrates a detail view of the disc used to guide the indicator actuating reed.

Referring to Fig. 1 of the drawing in detail reference numeral 1 designates a tubular member made of suitable metallic or molding material, the choice of material used depending upon the range of temperatures at which the thermometer is to be used. A disc shaped member 2 having an annular flange 2a is positioned in one end of the tube 1 and is retained in place against the punched and extruded sections 3 by the inwardly spun lip 4 of the end of the tube 1. An arm 5 is attached by rivets 6 to the flange 2a of the member 2. The end 7a of the spiral shaped bi-metallic member 7, illustrated in Fig. 4, is attached to the arm 5 by rivets 8. It is, of course, apparent that the rivets 6 and 8 may be replaced by other suitable fastening means and that if desired these joints may be spot welded.

The reed or wire 10 is attached at one end to the inner end 7b of the bi-metal spiral by the screw 9. The other end of this wire passes through the hole 11 in the disc 12, illustrated in Fig. 7, which is held in position inside of the tube 1 by the inwardly extruded projections 13 and the edge of the flange of the member 16. A pointer 14 is attached to the wire 10 by the set screw 15.

The member 16 is provided with an arcuate slot 17, as illustrated in Fig. 5, to permit the viewing therethrough of the indicating pointer 14. Along an edge of this slot are positioned indicia, such as, numbers for indicating the temperature. This member 16 is held in the end of the tube 1 by the inwardly spun edge 18 of the latter and by the screws 23.

A tube 19 is positioned over a portion of the exterior of tube 1 spaced by $\frac{1}{16}$ to $\frac{1}{8}$ of an inch therefrom by the indentures 20, illustrated in Fig. 6, for the purpose of providing an insulated handle by which the thermometer may be conveniently handled in use.

Each of the thermometers is calibrated by immersing the active element 7 into the hot metal or hot liquid which is at a predetermined temperature. The hot liquid gains access to the element 7 through the holes 21 of the member 2. After the element is subjected to the hot liquid it expands or unwinds because of the dis-similar co-efficients of expansion of the metals or alloys comprising the strips of the bi-metallic element and rotary motion is imparted to the wire 10. The pointer 14 is thereby moved over a portion of its scale. The member 16 is then moved so that the reading of the scale, adjacent to the slot 17, for which the thermometer is being calibrated corresponds in position to the position of the pointer. The set screws 23 are then adjusted to hold the member 16 in the proper position and the edges 18 of the tube 1 are pressed inward against the member 16.

In selecting the elements 7 care must be exercised that the element when unwound or expanded at the temperature at which the thermometer is to be used does not touch the inner surface of the tube 1. It is preferred that this element have a certain degree of expansion and contraction above and below the working temperature, in this way the pointer 14 is at or near the center of the scale when the thermometer is used for temperature readings for which it was designed and it may be readily observed that if the reading is lower the liquid temperature is too low and if the reading is higher the temperature is too high.

Proper precautions must also be taken to prevent air from being trapped in the tube 1 when the end adjacent to the element 7 is immersed into the liquid so that the liquid may be permitted to enter the tube freely. In the present invention the air is permitted to escape from the tube 1 through holes formed when the stops 13 are punched from this tube.

While I have described my invention in considerable detail it is apparent that numerous modifications thereof may be made without departing from the spirit and scope thereof and that therefore I do not desire to limit the invention to the exact details set forth except in so far as they may be defined by the appended claims.

What I claim and desire to secure by Letters Patent of the United States is as follows:

1. A portable thermometer comprising an elongated tubular member of substantially uniform diameter adapted to be immersed at one end into a liquid the temperature of which is being measured, said member being open at said end to permit free flow of said liquid thereinto, temperature indicating means positioned in said tubular member, said temperature indicating means having a temperature responsive expansible member positioned inside of said tubular member at the end adapted to be immersed in the liquid, and an apertured guard member in the open end of said tubular member to protect said expansible member from damage and still permit contact between substantially all of the surfaces of said expansible member and said liquid.

2. A portable thermometer comprising an elongated unitary tubular member of uniform diameter, apertured cap members for each end of said tubular member, temperature indicating means positioned in said tubular member, one end of said temperature indicating means being provided with temperature responsive expansible means, said expansible means being adapted to be at least partially immersed in the liquid, the temperature of which is being measured, flowing into said tubular member through one of said apertured cap members.

3. A thermometer as in claim 2 having, a handle supported around one end of said elongated member, and means extruded from said handle for bearing against surfaces of said member and for providing a spacing between said member and said handle.

4. A portable thermometer comprising an elongated tubular member of substantially uniform diameter, said tubular member being adapted to have one end thereof immersed into a liquid for temperature measurements, said end thereof being open sufficiently to permit liquid to flow thereinto freely, temperature responsive expansible means positioned inside of said tubular member adjacent to said open end to come in contact with the liquid flowing into said tubular member, a guard member for the open end of said tubular member for protecting said temperature responsive means but permitting liquid to flow therethrough to said temperature responsive means, a scale at the other end of said tubular member and means for indicating the expansion of said temperature responsive means on said scale.

WILLIAM CARROTHERS DILLON.